(12) United States Patent
Spariosu et al.

(10) Patent No.: US 8,050,303 B2
(45) Date of Patent: Nov. 1, 2011

(54) LASER BASED ON QUANTUM DOT ACTIVATED MEDIA WITH FORSTER RESONANT ENERGY TRANSFER EXCITATION

(75) Inventors: Kalin Spariosu, Thousand Oaks, CA (US); Alexander A. Betin, Manhattan Beach, CA (US); Michael LoCascio, Clifton Park, NY (US); Wei Liu, Schenectady, NY (US)

(73) Assignees: Raytheon Company, Waltham, MA (US); Evident Technologies, Inc., Troy, NY (US)

( * ) Notice: Subject to any disclaimer, the term of this patent is extended or adjusted under 35 U.S.C. 154(b) by 4 days.

(21) Appl. No.: 11/403,090

(22) Filed: Apr. 12, 2006

(65) Prior Publication Data
US 2007/0242713 A1 Oct. 18, 2007

(51) Int. Cl.
*H01S 3/14* (2006.01)
(52) U.S. Cl. ............ 372/39; 372/40; 372/41
(58) Field of Classification Search ............ 372/39, 372/40, 41
See application file for complete search history.

(56) References Cited

U.S. PATENT DOCUMENTS

| | | | |
|---|---|---|---|
| 5,422,907 A | 6/1995 | Bhargava | |
| 6,194,213 B1* | 2/2001 | Barbera-Guillem | 435/7.21 |
| 2002/0018632 A1* | 2/2002 | Pelka | 385/130 |
| 2005/0039433 A1 | 2/2005 | Nakano et al. | |
| 2005/0141078 A1 | 6/2005 | Jung | |
| 2005/0185686 A1* | 8/2005 | Rupasov et al. | 372/43.01 |
| 2005/0250141 A1* | 11/2005 | Lambert et al. | 435/6 |
| 2006/0007800 A1* | 1/2006 | Basu | 369/44.14 |
| 2007/0087195 A1* | 4/2007 | Meyer et al. | 428/403 |
| 2007/0183474 A1* | 8/2007 | Spariosu et al. | 372/79 |

OTHER PUBLICATIONS

C.R. Kagan et al., Phys. Rev. Lett., 76(9), (1996), pp. 1517-1520.
A. Javier et al., J. Phys. Chem. B 2003, 107, pp. 425,442.
A.R. Clapp et al., J. Am. Chem. Soc. 2004, 126, pp. 301-310.
C.F. Bohren and D.R. Huffman, "Absorption and Scattering of Light by Small Particles", Wiley (1983), pp. 82-136.
R.J. Ellingson et al., Nano Lett. 5(5), 865-871 (2005).
R.D. Schaller and V.I Klimov, Phys Rev Lett. 92(18), 186601-1 to 4 (May 2004).
Exciton-erbium energy transfer in Si nonocrystal-doped SiO2, Kik, P G et all . vol. 81, No. 1-3, p. 3, right hand column.
High Efficiency Carrier Multiplication in PbSe Nanocrystals: Implications for Solar Energy Conversion. RD Schaller et al. Physical REview Letters, vol., 92, No. 18, 5 May 2.
Yang, P., et al., Mirrorless lasing from Mesostructured Waveguides Patterned by Soft Lithography, Science, vol. 287, pp. 465-467 (2000).
Matsui, T., et al., "Flexible mirrorless laser based on a free-standing film of photopolymerized cholesteric liquid crystal", App. Phys. Letts., vol. 81, No. 20, pp. 3741-3743 (2002).

\* cited by examiner

*Primary Examiner* — Kinam Park
(74) *Attorney, Agent, or Firm* — Pillsbury Winthrop Shaw Pittman LLP

(57) ABSTRACT

A laser gain medium. The novel laser gain medium includes a host material, a plurality of quantum dots dispersed throughout the host material, and a plurality of laser active ions surrounding each of the quantum dots. The laser active ions are disposed in close proximity to the quantum dots such that energy absorbed by the quantum dots is non-radiatively transferred to the ions via a Forster resonant energy transfer, thereby exciting the ions to produce laser output. In an illustrative embodiment, each quantum dot is surrounded by an external shell doped with the laser active ions.

17 Claims, 7 Drawing Sheets

LASER BASED ON QUANTUM DOT ACTIVATED MEDIA WITH FORSTER RESONANT ENERGY TRANSFER EXCITATION

BACKGROUND OF THE INVENTION

1. Field of the Invention

The present invention relates to optical systems. More specifically, the present invention relates to lasers.

2. Description of the Related Art

The implementation of compact transmitters ranging from flash ladar active sensors to high energy weapon-class laser systems is currently limited to large platforms due to the relatively low power per weight ratio numbers in the present approaches. Efficient diode laser pumped solid-state lasers have pushed the wall-plug efficiency to levels exceeding 25% and have scaled to multi-kilowatt powers in inherently compact systems for sensor transmitters and—ultimately—directed energy weapon implementation. Practical utility of diode-pumped lasers is still limited, however, by the need for extensive sophisticated thermal management infrastructures that add to the complexity, weight, and power of the overall laser system. This becomes especially important for space-borne and airborne platforms where weight-volume envelopes need to be kept to a minimum. In addition, certain laser waveforms (such as high peak power—short pulse and low duty cycle) are not at all suited for diode pumping; however, the alternate flash lamp pumping approach is very inefficient in conventional lasers.

Flash lamp pumped lasers are widely used in today's industrial, medical and research laser systems. These lasers, however, are inherently inefficient because of the poor spectral overlap between the flash-lamp spectral emission and the absorption bands of REI (rare earth ion) doped insulating crystal hosts (such as $Nd^{3+}, Yb^{3+}, Er^{3+}$, etc. in crystals, glass, polymers, etc.). Although efficient integrating pump cavities have been employed in order to bring the efficiencies of Nd:YAG lasers to as high as 3-4%, the significant waste heat loading in these lasers in addition to the poor efficiency prevents them from being scaled to compact high energy waveforms within compact architectures/geometries.

Sunlight pumped lasers have been studied and demonstrated; however, these devices generally utilize conventional REI-doped insulating crystal hosts/gain media and therefore have limited efficiency due to the poor spectral overlap of the sun's blackbody emission and the relatively narrow absorption bands of REI ions.

Semiconductor (SC) lasers can be more efficient than REI-based lasers, but typically are not suitable for high energy/power scaling. Recent work on optically pumped semiconductor lasers and amplifiers in addition to optically pumped quantum dots (QDs) shows promise for directly pumped SC-based lasers. However, due to the extremely high saturation intensities of SC lasers, they are typically limited to micron-scale waveguide geometries and are not scalable to practical bulk high energy laser geometries.

Hence, a need exists in the art for an improved compact, lightweight laser that is scalable for high energy and power that offers higher efficiency than conventional approaches.

SUMMARY OF THE INVENTION

The need in the art is addressed by the laser gain medium of the present invention. The novel laser gain medium includes a host material, a plurality of quantum dots dispersed throughout the host material, and a plurality of laser active ions surrounding each of the quantum dots. The laser active ions are disposed in close proximity to the quantum dots such that energy absorbed by the quantum dots is non-radiatively transferred to the ions via a Forster resonant energy transfer, thereby exciting the ions to produce laser output. In an illustrative embodiment, each quantum dot is surrounded by an external shell doped with the laser active ions.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Optically pumped quantum dot (QD) lasers using QDs as the laser gain medium have been studied and demonstrated in the prior art. Quantum dots are fabricated from semiconductor material in a geometry such that a quantum confinement exists in all three dimensions, resulting in emission spectra having a discrete number of energy states.

Figure 1:
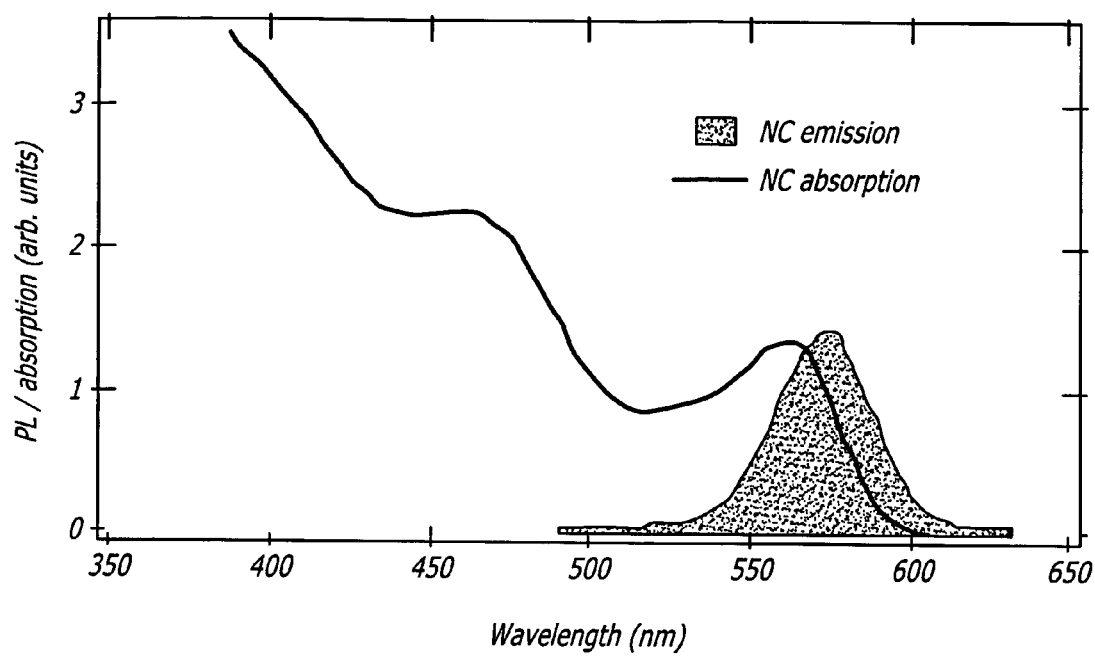
FIG. 1 is a graph showing example QD absorption and emission spectra.

FIG. 1 is a graph showing example QD absorption and emission spectra Quantum dot lasers can efficiently convert broadband pump energy to narrowband laser energy; however, they typically require extremely high saturation intensities because of their short exciton lifetimes (electron-hole recombination times). At best, the exciton lifetimes are on the order of several nanoseconds, such that very high waveguide confinement is needed for efficient laser action. QD lasers, therefore, are typically not scalable to practical high energy laser geometries.

Figure 2A:
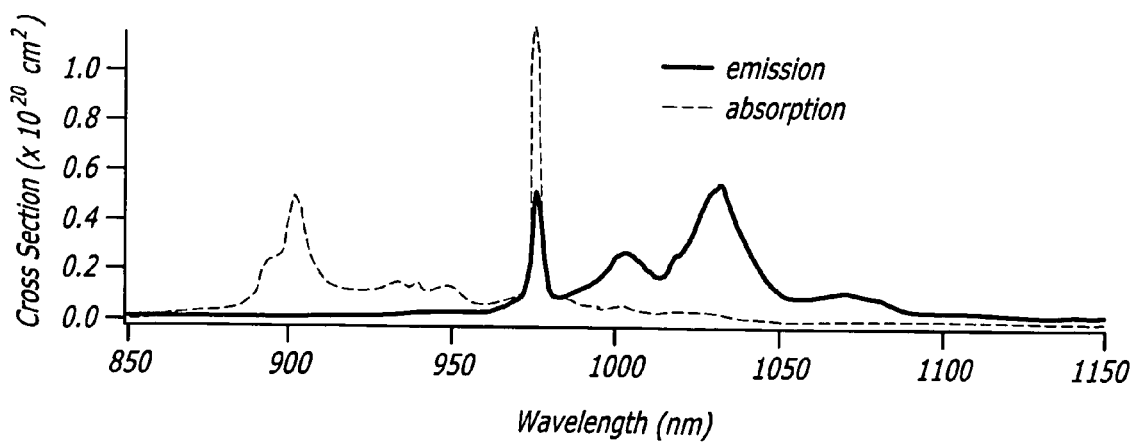
FIG. 2a is a graph showing typical absorption and emission spectra for Yb:YAG.
Figure 2B:
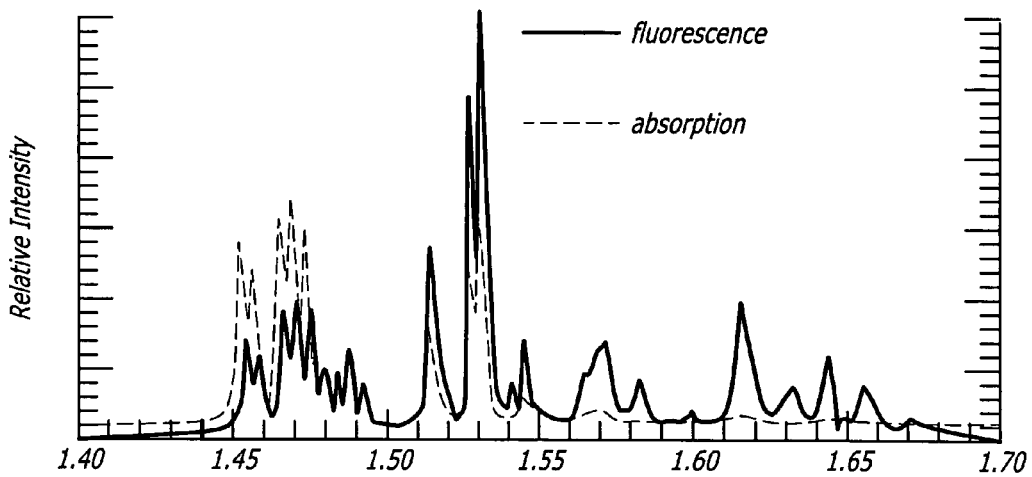
FIG. 2b is a graph showing typical absorption and emission spectra for Er:YAG.

As discussed above, REI (rare earth ion) based laser gain media are much more amenable to high energy/power scaling than semiconductor-based lasers. However, REIs typically have narrow absorption bands that limit efficient operation to diode pumping. FIGS. 2a and 2b are graphs showing typical absorption and emission spectra for Yb:YAG and Er:YAG, respectively. Diode pump sources, however, are expensive and typically require sophisticated thermal management infrastructures that add to the complexity, weight, and power of the overall laser system.

The novel laser excitation approach of the present invention takes advantage of the favorable spectral properties of QDs and the ideal gain properties of REI—based gain media. The present invention combines the spectral transformation of absorbed broadband pump radiation to narrowband resonant excitation of REI active ions in an integrated gain medium/geometry that can be scaled to high energy and power within favorable cross-sectional dimensions. QDs evenly dispersed through the gain medium/matrix provide for the efficient absorption of broadband light and non-radiative energy transfer to the REI active ions. The main mechanism for efficient non-radiative energy transfer from the QDs to the REI active ions is via a Forster energy transfer process. Subsequent lasing can then occur with efficiencies comparable to diode pumped operation from the REI ions.

Figure 3:
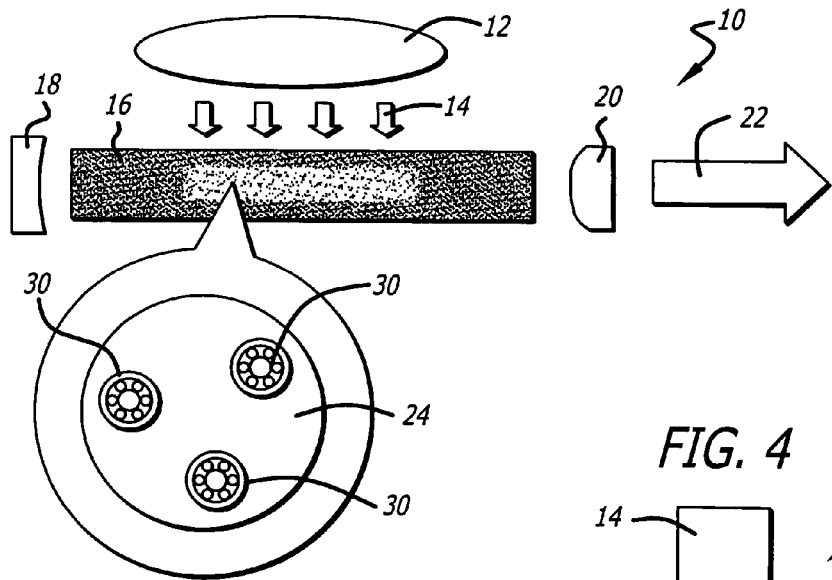
FIG. 3 is a simplified schematic of an illustrative embodiment of a laser designed in accordance with the teachings of the present invention.

FIG. 3 is a simplified schematic of an illustrative embodiment of a laser 10 designed in accordance with the teachings of the present invention. The laser 10 includes a pump source 12, such as a flash lamp, arc lamp, or the sun, that radiates broadband energy 14 onto a novel gain medium 16 disposed in a resonator formed by a mirror 18 and an output coupler 20 (a partially reflective mirror) to produce laser output 22. In accordance with the present teachings, the gain medium 16 includes a plurality of quantum dot shell structures 30 that are dispersed evenly (homogenously) throughout an insulating host 24. In the illustrative embodiment, the gain medium 12 is implemented with a solid-state insulating (crystal or amorphous) host. The invention, however, is not limited thereto. Other types of hosts, including liquid or gas, can also be used without departing from the scope of the present teachings.

Each quantum dot shell structure 30 includes a quantum dot surrounded by a plurality of REI ions. The laser active ions are disposed in close proximity to the QD such that energy absorbed by the QD is non-radiatively transferred to the REI ions via a Forster resonant energy transfer. Through this energy transfer, wideband energy absorbed by the QDs can be efficiently transformed to selective tuned narrowband emission matched to the absorption band(s) of the REI ions.

Figure 4:
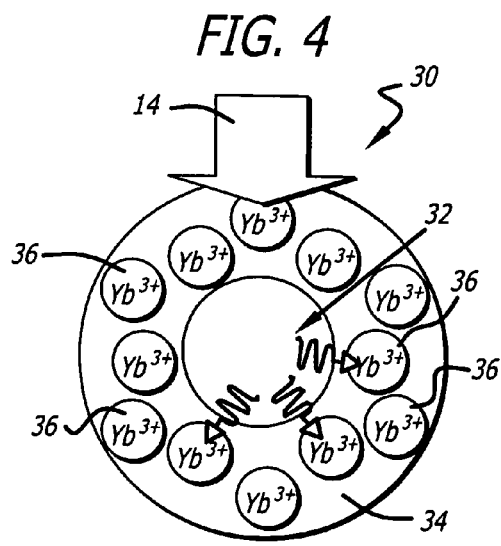
FIG. 4 is a simplified schematic of an illustrative embodiment of a quantum dot shell structure designed in accordance with the teachings of the present invention.

FIG. 4 is a simplified schematic of an illustrative embodiment of a quantum dot shell structure 30 designed in accordance with the teachings of the present invention (figure is not drawn to scale). The novel quantum dot shell structure 30 is comprised of a quantum dot 32 that is passivated with an external shell 34 to prevent the shortening of the QD exciton lifetime. The shell 34 can be made from semiconductor (similar or dissimilar to the QD core), polymer, or other suitable material. Methods and materials for fabricating QD shell structures are known in the art. In accordance with the present teachings, the external shell 34 is doped with REI active ions 36 (such as $Nd^{3+}$, $Yb^{3+}$, $Er^{3+}$, etc.). Optionally, the QDs 32 may include multiple shell layers, with one or more layers doped with REI ions. A possible benefit of multiple shells could be to provide an index of refraction better matched to that of the gain medium host 24.

Broadband energy 14 radiated from the pump source 12 (as shown in FIG. 3) is absorbed by the QDs 32 and then non-radiatively transferred to spectrally matched absorption band (s) of the REI active ions 36. By disposing the REI ions 36 in close proximity to the QD core 32, the excitation of the REI ions 36 can be effected very efficiently via the non-radiative energy transfer process called Forster resonant energy transfer (FRET). This is a well-known phenomenon that is described in several textbooks and publications. See, for example, the following references, the teachings of which are incorporated herein by reference:

1. N. J. Turro, "Modern Molecular Photochemistry", University Science Books 1991, pp. 301-305.
2. C. R. Kagan et al, Phys. Rev. Lett., 76(9), (1996), pp. 1517-1520.
3. A. Javier et al, J. Phys. Chem. B 2003, 107, pp. 425-442.
4. A. R. Clapp et al, J. Am. Chem. Soc. 2004, 126, pp. 310-310.

The QDs 32 should be synthesized with an outer shell 34 that contains REI ions 36 with a doping density that provides for the most efficient laser action. The QD shell structures 30 are dispersed homogeneously throughout the bulk insulating gain host 24. The QD-activated REI-doped insulating solid host then provides for an efficient absorption of the broadband pump light 14 and lases with efficiencies approaching that of laser diodes.

There are a number of implications as a consequence of this novel laser gain architecture. The first consideration is the scattering losses due to the QDs. Modeling of this effect has found that the extinction due to the cumulative scattering should be manageable. Starting with a nominal 5 nm diameter of the QDs, the number of REI "spheres" can be calculated given an effective packing density to correspond to ~1% doping density. The number of REI ions per sphere as a function of outside sphere radius, $r_{SR}$ can be written as:

$$N_{REI}(r_{SR}) = \frac{(r_{SR}^3 - r_{QD}^3)\rho_{packing}}{r_{REI}^3} \quad [1]$$

where $r_{QD}$ is the radius of the QD sphere and $r_{REI}$ is the radius of the REI ion.

Figure 5:
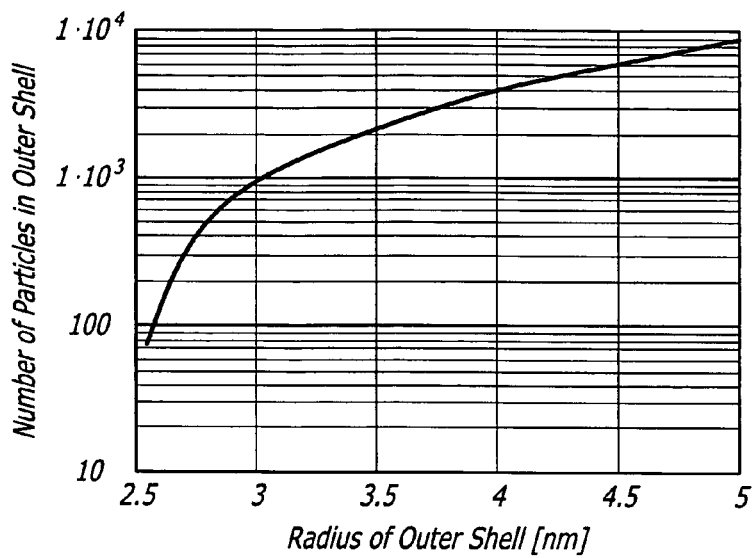
FIG. 5 is a graph showing the scaling of REI particles per QD assembly for an illustrative laser designed in accordance with the present teachings.

FIG. 5 is a graph showing the scaling of REI particles per QD assembly for an illustrative laser designed in accordance with the present teachings. This example assumes a nominal 1% doping density as a function of outside shell radius and a 1-Angstrom REI "sphere" diameter. It is clear that with just a 3 nm radius (6 nm diameter) outer shell one can pack approximately 1000 ions in each shell.

The Mie scattering theory is well known in the public literature. See, for example, the following reference, the teachings of which are incorporated herein by reference:

5. C. F. Bohren and D. R. Huffinan, "Absorption and Scattering of Light by Small Particles", Wiley (1983), pp: 82-136.

Using the formulation of this reference, the extinction per single sphere (normalized cross-section) can be written as:

$$\varepsilon_{SS} = \frac{8}{3}(\kappa r_{QD})^4 \left[\frac{m^2-1}{m^2+1}\right]^2 \quad [2]$$

where $$\kappa = \frac{2\pi n_{medium}}{\lambda}, \ m = \frac{n_{sphere}}{n_{medium}}, \ \lambda$$

is the wavelength of light, and the n—values are the indices of refractions as designated in subscript.

Then, for a nominal ion doping density of $N_{REI}=1\times10^{20}$ cm$^{-3}$ (which is about 0.7% concentration by weight) and a sphere diameter of $r_{QD}=2.5$ nm (a typical diameter of a QD is 5 nm), the extinction coefficient [cm$^{-1}$] due to scattering can be calculated from the following expression:

$$\alpha_S = \frac{8 N_{spheres} \pi r_{QD}^2}{3}(\kappa r_{QD})^4 \left[\frac{m^2-1}{m^2+1}\right]^2 \quad [3]$$

where $N_{spheres}$ is the sphere density as defined in terms of the ion doping density, $N_{REI}$, as:

$$N_{spheres} = \frac{N_{REI}}{1000} \quad [4]$$

and $\pi r_{QD}^2$ is the cross-sectional area of the sphere. $N_{spheres}$ is equivalent to the density of quantum dots in this context.

Figure 6A:
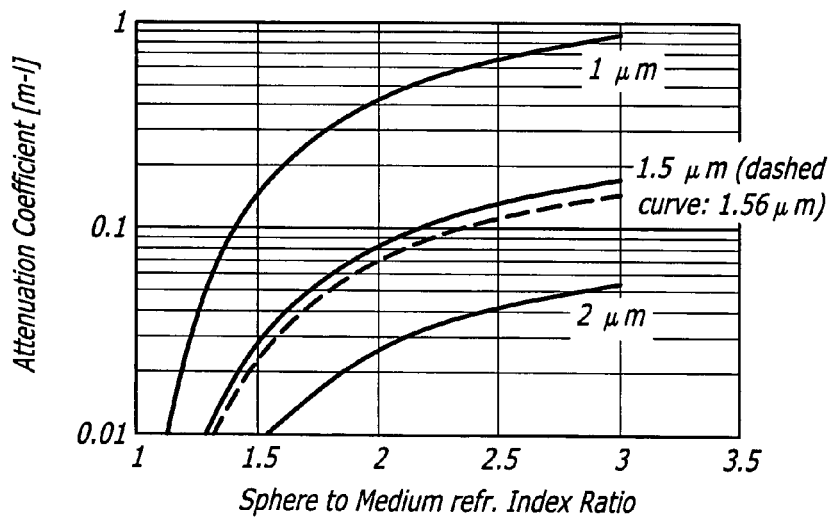
FIG. 6a is a graph showing the attenuation coefficient due to scattering in a QD-activated gain medium as a function of refractive index (QD to medium) ratio for an illustrative laser designed in accordance with the present teachings.
Figure 6B:
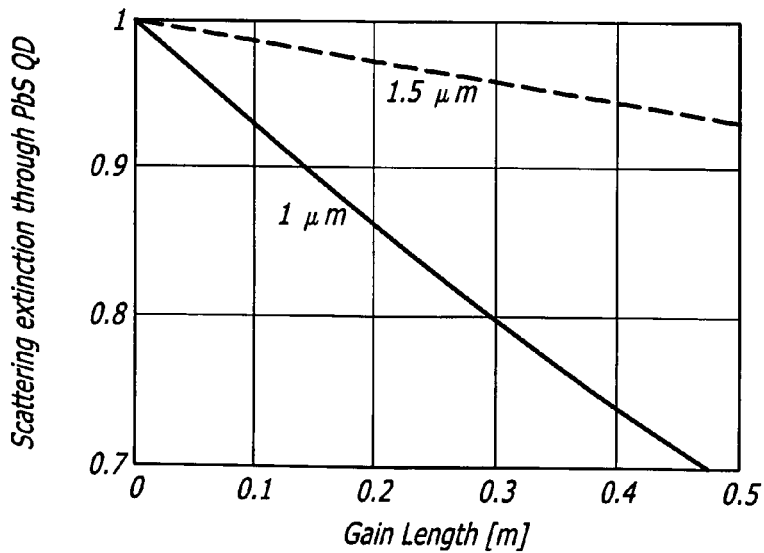
FIG. 6b is a graph plotting the net transmission of the laser radiation through this medium as a function of gain length for an illustrative laser designed in accordance with the present teachings.

FIG. 6a is an graph showing the calculated attenuation coefficient due to scattering in a QD-activated gain medium as a function of refractive index (QD to medium) ratio for an illustrative laser designed in accordance with the present teachings. This example assumes 5 nm diameter QD spheres at three wavelengths: 1 µm, 1.5 µm, and 2 µm. FIG. 6b is a graph plotting the calculated net transmission of the laser radiation through this medium as a function of gain length for an illustrative laser designed in accordance with the present teachings, assuming an effective QD sphere density of $N_{sphere}=1\times10^{17}$ cm$^{-3}$ for two wavelengths: 1 µm and 1.5 µm. The losses (and transmission) are calculated as a function of gain length for changing index of refraction ratio (with respect to the medium index of refraction). The calculation is extended to the maximum index of refraction ratio of 3, which corresponds to the QD index of refraction of 4.5 (which is the case for PbS), given a nominal 1.5 refractive index surrounding medium.

Even for a 1 µm wavelength, the extinction coefficient due to scattering is manageable for practical gain lengths. An Er laser operating near 1.5 µm has less than 10% attenuation even for 50 cm gain lengths. Implementing a disk laser geometry can utilize gain lengths of less than 10 cm and still be capable of multi-kW operation, even with the 1 µm Yb laser. Of course, the design space allows for gain optimization (minimization of scattering losses). For example, one can use a high index glass host that will decrease the scattering losses. In addition, one can reduce the scattering losses by decreasing the QD density. This will result in more REI ions per individual QD in order to maintain the same ion density. This is especially attractive in the case of Yb since it is a laser gain REI that does not suffer from any concentration quenching effects. One possible implementation of a QD-activated laser gain geometry is shown in FIG. 7.

Figure 7:
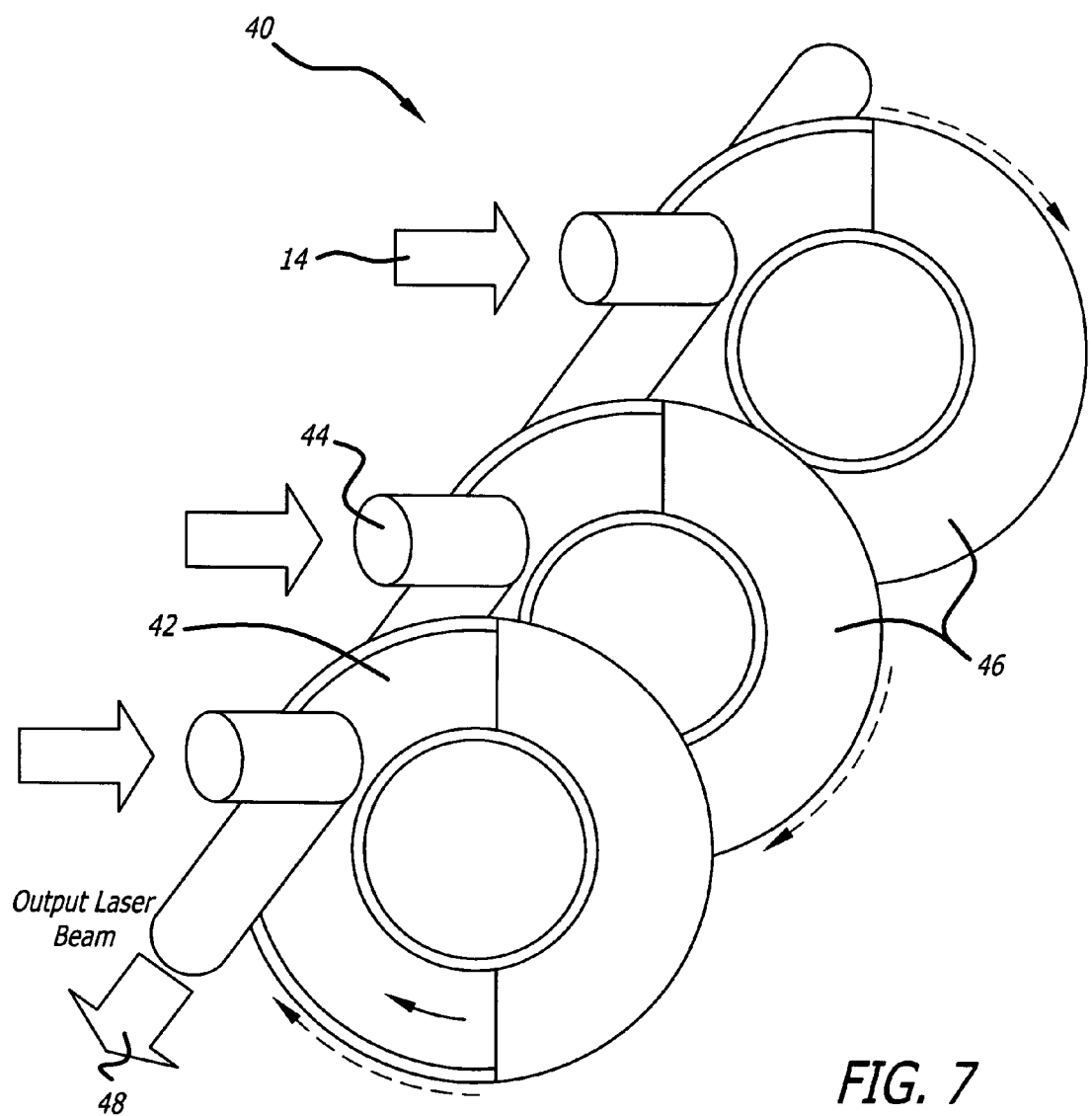
FIG. 7 is a simplified schematic of an illustrative disk implementation of a laser designed in accordance with the teachings of the present invention.

FIG. 7 is a simplified schematic of an illustrative disk implementation of a laser 50 designed in accordance with the teachings of the present invention. The laser 50 is similar to the general laser 10 shown in FIG. 3, except that the gain medium includes an array of gain medium disks 42 arranged such that laser output from each disk adds coherently to its neighbors to form a larger laser output beam 48. The disks are implemented with a solid insulating host containing a plurality of the QD shell structures described above. Broadband energy 14 (from a pump source such as the sun) is concentrated to a pump volume at each disk by an optical arrangement 44. Each disk 42 is placed in a disk assembly 46 adapted to rotate the disk 42 such that the dwell time of the pump volume is short for minimal thermal loading. The disk assembly 46 may also include a cooling manifold to further reduce thermal effects.

Utilizing a disk geometry enables the implementation of overall—cumulative—gain lengths that are less than 10 cm where scattering losses are truly negligible, even for the Yb 1 µm laser. In addition, thermal management of such a structure is very favorable considering that the solid host is likely to be an amorphous glass or polymer with relatively low thermal conductivity.

As discussed above, the excitation of the REI ions in close proximity to the QD core sphere can be effected very efficiently via the non-radiative energy transfer process also called the Forster resonant energy transfer (FRET). The FRET process efficiency depends on the overlap integral defined as:

$$I = \int_0^\infty P_L(\lambda)\varepsilon_A(\lambda)\lambda^4 d\lambda \quad [5]$$

where $P_L(\alpha)$ is the donor (QD) probability of energy transfer into a neighboring ion as a function of wavelength, normalized to unity after integration over entire spectral range, and $\epsilon(\lambda)$ is the molar extinction (absorption) coefficient [cm$^{-1}$M$^{-1}$] of the acceptor species (dye molecule or REI). The FRET energy transfer rate as a function of the separation of donor to acceptor centers, r, and the exciton decay time, $\tau_D$, is defined as:

$$k_{FRET} = \frac{1}{\tau_D}\left[\frac{R_F}{r}\right]^6 \quad [6]$$

The Forster radius is given by:

$$R_F = \left[\frac{9\ln(10)Q_Y\kappa_p^2}{128\pi^5 n_{medium}^4 N_A}I\right]^{1/6} \quad [7]$$

where $Q_Y$ is the quantum yield of the QD, $\kappa_p$ is the dipole orientation overlap factor (0 for orthogonal, 2 for parallel, mt;epmrl;√⅔rlxmx for random), and $N_A$ is Avogadro's number. The Forster radius is the donor (QD) to acceptor (REI) separation where the FRET transfer rate is equal to the exciton decay rate given by $1/\tau_D$. The FRET efficiency (defined as the fraction of excitons that undergo FRET to the acceptor(s)) is given by:

$$\eta_{SA} = \frac{R_F^6}{R_F^6 + r^6} \qquad [8]$$

for a single acceptor per QD donor, and by:

$$\eta_{MA} = \frac{N_{acceptor} R_F^6}{N_{acceptor} R_F^6 + r^6} \qquad [9]$$

for multiple acceptors surrounding the single QD donor.

Figure 8:
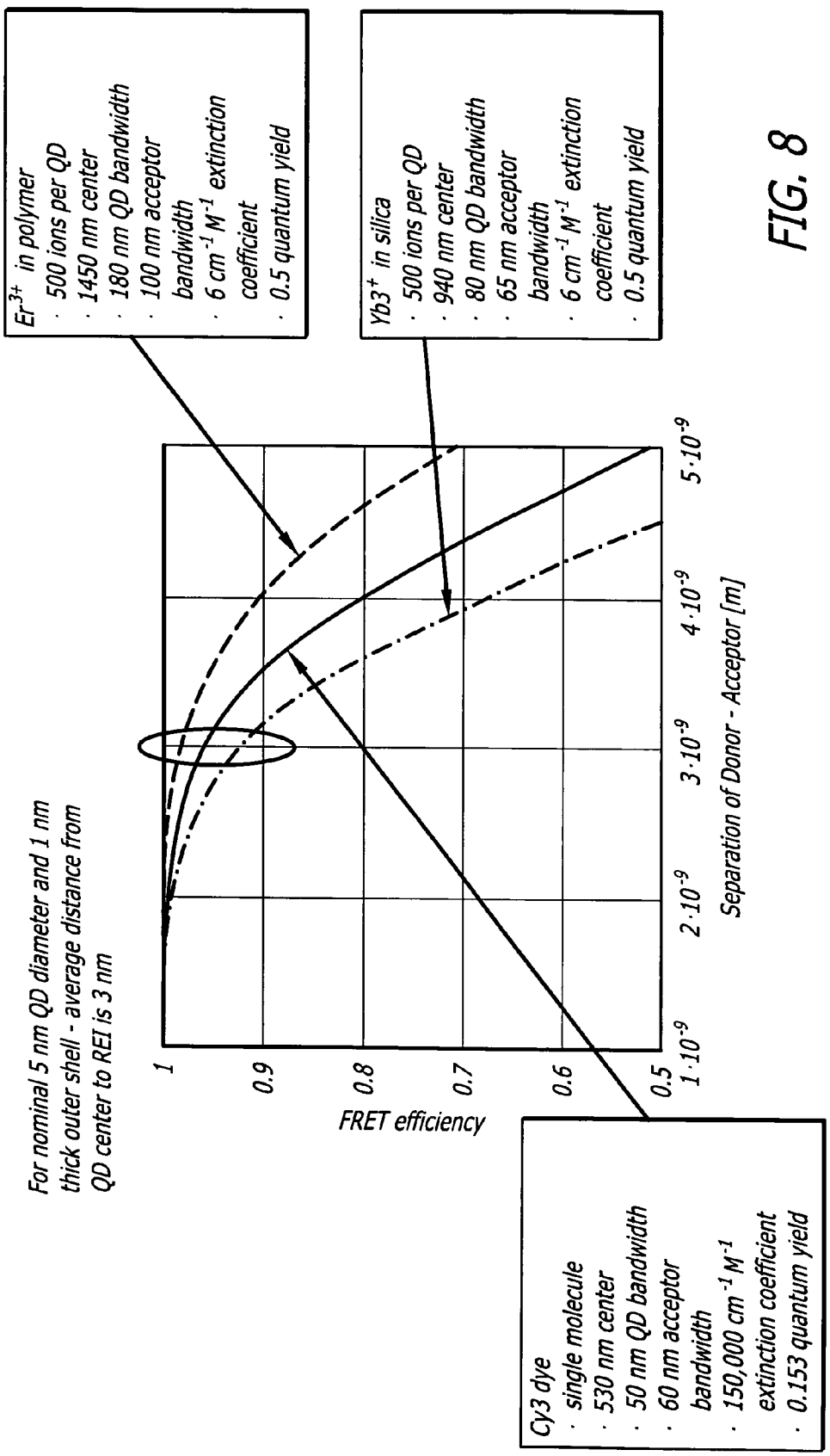
FIG. 8 is a graph showing FRET efficiency as, a function, of donor—acceptor separation for an illustrative laser designed in accordance with the present teachings.

FIG. 8 is a graph showing calculated FRET efficiency as a function of donor-acceptor separation (average distance from QD center to REI) for an illustrative laser designed in accordance with the present teachings. This model assumes a nominal 5 nm QD diameter, 1 nm thick outer shell, and a QD exciton lifetime $\tau_D$ of 2.3 ns. Results are plotted for $Yb^{3+}$ in silica, $Er^{3+}$ in polymer, and a Cy3 dye molecule for reference. Even for a conservative number of 500 ions per QD sphere, the FRET efficiency exceeds 90%.

Figure 9A:
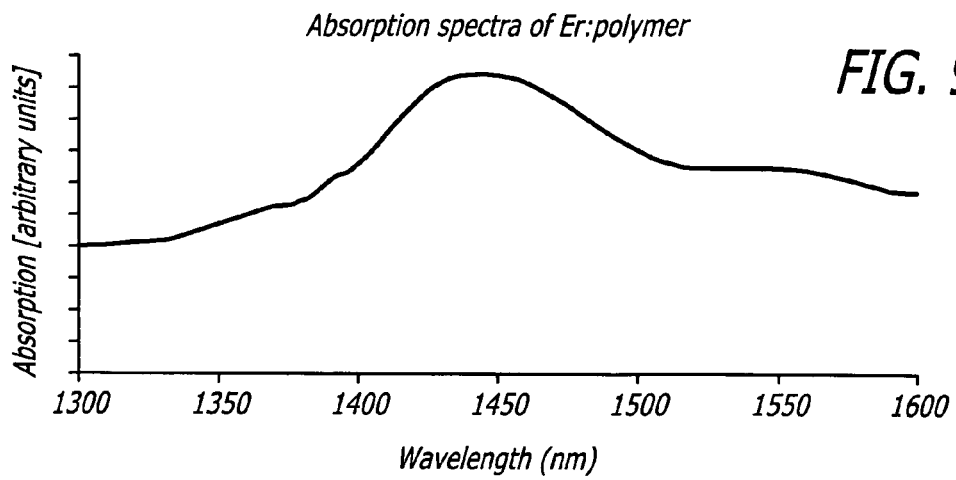
FIG. 9a is a graph showing the expected spectral absorption of Er:polymer.
Figure 9B:
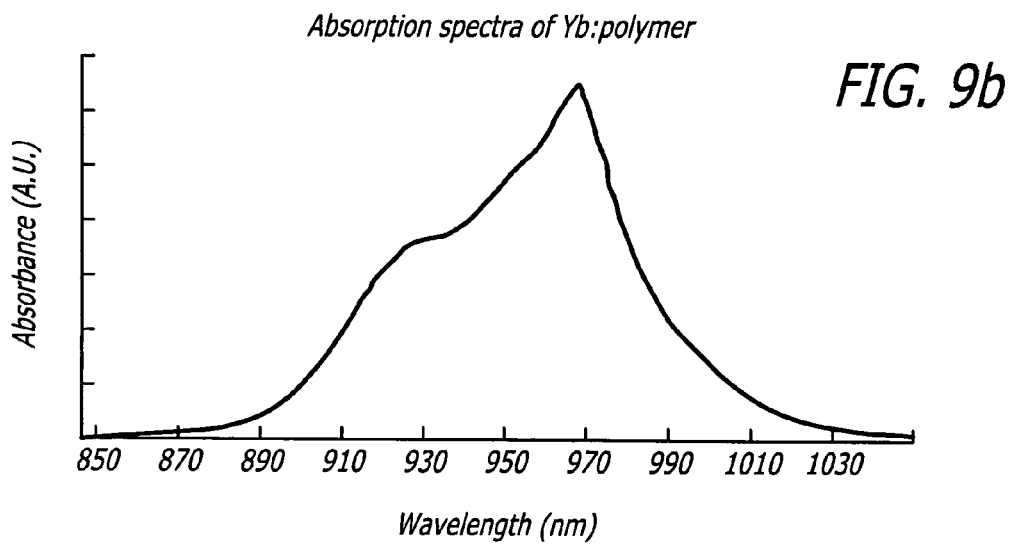
FIG. 9b is a graph showing the expected spectral absorption of Yb:glass.

For $Yb^{3+}$ and $Er^{3+}$, the QD activated RET gain media can be an amorphous glass or polymer matrix synthesized via a sol-gel process. Er:polymer and Yb:glass absorption spectra have excellent matches to the QD emission bandwidths. FIGS. 9a and 9b are graphs showing the expected spectral absorption of Er:polymer and Yb:glass, respectively.

The FWHMs from these spectra were used in the overlap integral calculations. The QD emission resonance bandwidth increases with the center emission wavelength as indicated in the sample data of Table 1, which shows typical QD performance at different wavelength regions.

TABLE 1

| Material System (Composition) | Type | Emmission Peak [nm] | Emmission Peak Tolerance | Typical FWHM [nm] | Crystal Diamter [nm-approx.] |
|---|---|---|---|---|---|
| CdTe/CdS | Core-Shell | 660 | +/−10 | 30 | 4.3 |
| CdTe/CdS | Core-Shell | 680 | +/−10 | 30 | 4.8 |
| PbS | Core | 850 | +/−50 | 80 | |
| PbS | Core | 950 | +/−50 | 80 | |
| PbSe | Core | 1200 | +/−100 | 180 | 4.5 |
| PbSe | Core | 1400 | +/−100 | 180 | 5 |
| PbSe | Core | 1630 | +/−100 | 180 | 5.5 |

Quantum yield (QY) is measured with respect to a fluorescent dye standard. Fluorescent dye has an absorption maxima relatively close to the emission peak so that in a dye there is relatively little energy loss due to the change in input vs. output photons (typically a dye will exhibit QYs of over 90%). QD shell structures have demonstrated greater than 80% QY. A conservative number of 50% QY was used in the REI FRET efficiency estimates above.

PL energy transfer efficiency is denoted by quantum yield. Quantum yield varies from 20-80% depending on the quality of the quantum dot, temperature, etc. The major non-radiative recombination route is through interband states caused by defects typically at the QD surface. The QD synthesis process as well as the addition of semiconductor shells reduces defects and hence increases QY.

Some general methods for growing QDs include the precipitation method, the strained growth method, and the colloidal method. With the precipitation method, nanocrystals are grown directly in glass by adding the semiconductor precursors (such as lead and sulfur) to a glass melt. As the melt is controllably cooled, nano-sized QDs will precipitate out. The limitations of this method are that the quantum dot concentration, compositions, size, size distribution, and uniformity of the sample may be limited or difficult to control. Adding shells to the QDs to make them brighter or to further modify QD properties through the addition of attached surface molecules are typically impossible.

With the strained growth method, a semiconductor having a large lattice mismatch with the substrate is deposited using Molecular Beam Epitaxy. Because of the lattice mismatch, the semiconductor coalesces into nano-sized islands. At this stage the quantum dot islands are buried under another semiconductor layer and the process is repeated until a large number of "buried QD" layers are produced. This approach produces high quality electro-optic devices but is expensive and typically consigned to small area and rigid substrates.

With the colloidal method, semiconductor precursors are added at temperature to specially prepared solvents and ligands (a ligand is an atom, ion or functional group that donates its electrons through a coordinate covalent bond to one or more central atoms or ions). The precursors disassociate, where the semiconductors are free to recombine to grow into QDs. QD size is determined by synthesis time and other conditions. This route is very suitable for large scale low-cost production. Using this approach, the possible QD compositions are nearly unlimited; after QD synthesis one or more semiconductor shells can be added to alter or improve performance, and organic or inorganic molecules can be added to the surface. In addition, after synthesis the QDs can be added to polymers, epoxies, sol-gels, silicones, etc. and can be further processed into microparticles, films, fibers, or large 3-d shapes.

Figure 10:
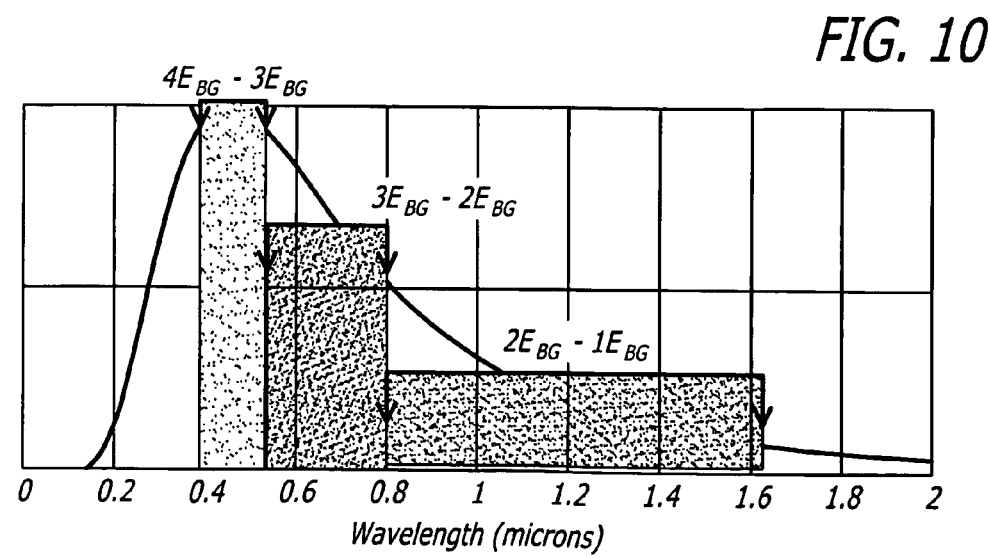
FIG. 10 is a graph of the blackbody spectral emission of the sun, showing the spectral integral for efficiency estimates at the single and multiple exciton generation approaches.

One possible application of a QD—FRET based laser is in space where sunlight can be used as the pump source. FIG. 10 is a graph of the blackbody spectral emission of the sun, showing the spectral integral for efficiency estimates at the single and multiple exciton generation approaches.

Recent demonstrations have shown that efficient multiple exciton generation processes may enable a significant boost in the overall spectral conversion efficiency for FRET as well as radiative spectral transformation from the QDs. See, for example, the following references, the teachings of which are incorporated herein by reference:

6. R. J. Ellingson et al, Nano Lett. 5(5), 865-871 (2005).

7. R. D. Schaller and V. I. Klimov, Phys Rev Lett. 92(18), 186601-1 to 4 (May, 2004).

The non-radiative energy transfer efficiency can be analyzed in a similar manner as the radiative energy transfer from the QD to the ion using the blackbody radiation spectral density treatise.

The following shows an estimate of the spectral conversion efficiency of the blackbody radiation within band (QD energy transfer/emission with respect to energy absorbed).

The blackbody energy density both in terms of frequency and wavelength is given by:

$$\rho(v) = \frac{8\pi v^2}{c^3} \frac{hv}{e^{\frac{hv}{kT}} - 1} \qquad [10]$$

$$\rho(\lambda) = \frac{8\pi hc}{\lambda^5} \frac{1}{e^{\frac{hc}{kT\lambda}} - 1} \qquad [11]$$

The intensity [W/cm²] emitted from a blackbody (within frequency range $v_2$-$vv_1$) can be written as:

$$\sigma T^4 = \frac{c}{4}\int_0^\infty \rho(v)\,dv \cong \frac{c}{4}\int_{v_1}^{v_2} \rho(v)\,dv \qquad [12]$$

for a large spectral interval $v_2$-$v_1$, where $\sigma=5.67\times10^{-8}$ [Wm$^{-2}$K$^{-4}$] and T is the temperature in [K].

The single exciton expression for the spectral conversion efficiency is given by:

$$\eta_{SE} = \frac{hv_{lase}\int_{v_{lower}}^{v_{upper}}\frac{\rho(v)}{hv}\,dv}{\int_{v_{lower}}^{v_{upper}}\rho(v)\,dv} \qquad [13]$$

where the $v_{lase}$ is the resonant laser frequency. The similar expression for the multiple exciton generation processes is given by:

$$\eta_{ME} = \frac{hv_{lase}\left\{\int_{v_{lase}}^{2v_{lase}}\frac{\rho(v)}{hv}\,dv + 2\int_{2v_{lase}}^{3v_{lase}}\frac{\rho(v)}{hv}\,dv + 3\int_{3v_{lase}}^{4v_{lase}}\frac{\rho(v)}{hv}\,dv\right\}}{\int_{v_{lower}}^{v_{upper}}\rho(v)\,dv} \qquad [14]$$

The spectral integral is such that $v_{lower}$ is chosen to correspond to $v_{lase}$ (1618 nm laser wavelength) whereas $v_{upper}=2v_{lase}$, $3v_{lase}$, or $4v_{lase}$. For an Er laser REI system, the integration for up to 3× band gap energy (corresponding to the laser photon energy) is from ~400 nm to 1620 nm. This is favorable in yet another way—namely, there is no need to pump with UV radiation (near 300-390 nm) thereby eliminating the common UV blackening (color center formation) in the host medium. The predicted efficiency plots based on this system (with reference to FIG. 10) are shown in FIG. 11.

Figure 11:
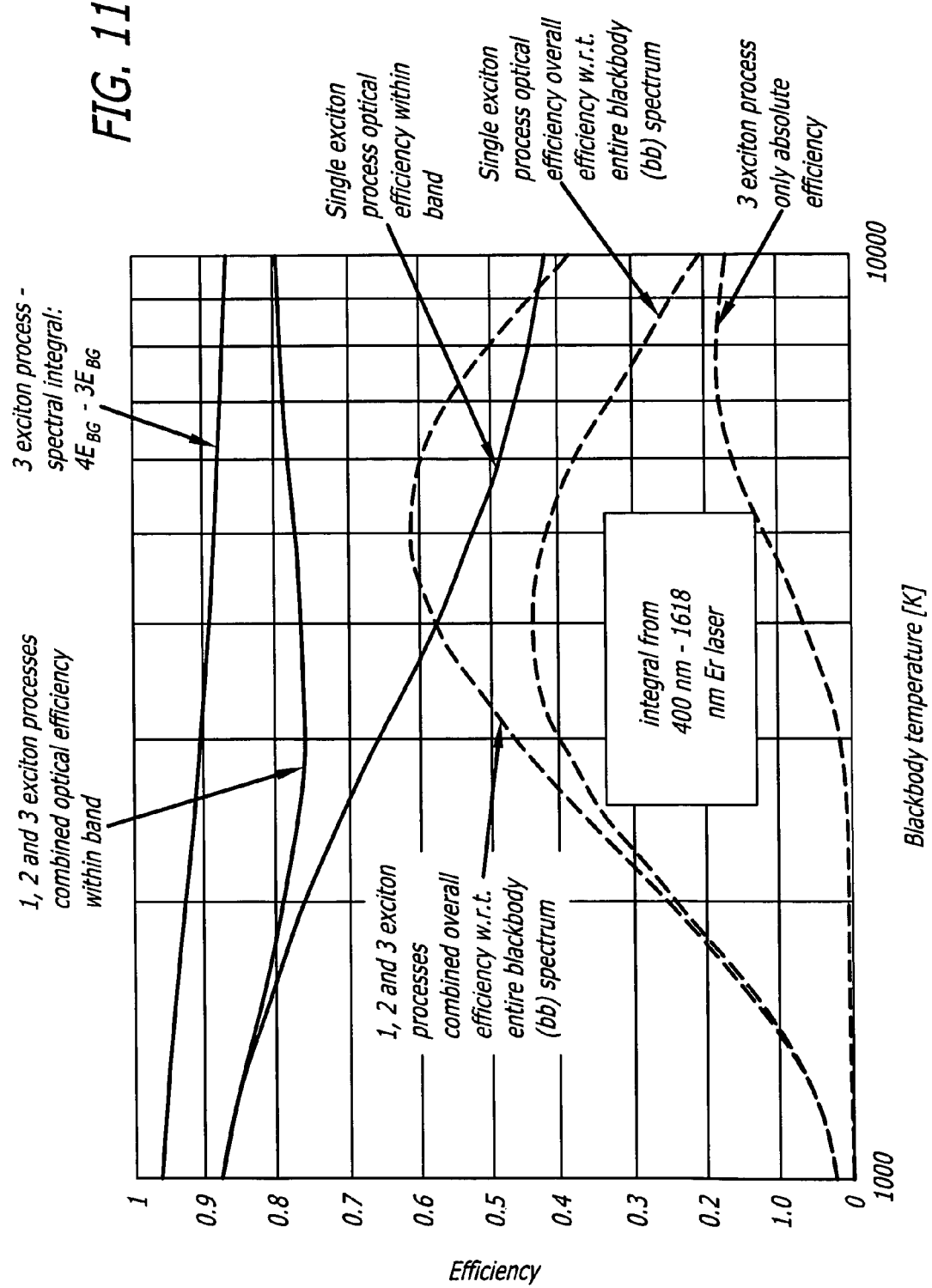
FIG. 11 is a graph of spectral conversion efficiency estimates vs. temperature for an illustrative Er laser designed in accordance with the teachings of the present invention.

FIG. 11 is a graph of spectral conversion efficiency estimates vs. temperature for an illustrative Er laser designed in accordance with the teachings of the present invention, showing in-band (spectrally filter—tailored pumping) indicated by the solid lines and overall with respect to the spectrally integrated broadband emission over the entire spectrum indicated by the dashed lines. This shows that one can tailor the filtering for allowable spectral content to excite the laser gain medium in order to maximize the spectral efficiency and minimize heat loading. That may come at a penalty, however, with respect to the overall spectrally integrated blackbody emission.

The absolute (with respect to the entire spectrally integrated broadband emission) efficiency expressions are given as:

$$\eta_{SEoverall} = \frac{\frac{c}{4}v_{lase}\int_{v_{lower}}^{v_{upper}}\frac{\rho(v)}{v}\,dv}{\sigma T^4} \qquad [15]$$

$$\eta_{MEO} = \frac{\frac{c}{4}v_{lase}\left\{\int_{v_{lase}}^{2v_{lase}}\frac{\rho(v)}{v}\,dv + 2\int_{2v_{lase}}^{3v_{lase}}\frac{\rho(v)}{v}\,dv + 3\int_{3v_{lase}}^{4v_{lase}}\frac{\rho(v)}{v}\,dv\right\}}{\sigma T^4} \qquad [16]$$

Since the pump energy source is essentially "free" in this space-based laser configuration, the overall/absolute efficiency is not as pertinent as the in-band efficiency that will govern the overall laser system design.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A laser gain medium comprising:
an insulating host material;
a plurality of undoped quantum dots dispersed throughout said insulating host material; and
a plurality of laser active ions surrounding each of said quantum dots,
wherein said plurality of laser active ions are disposed in proximity to said quantum dots such that energy is absorbed by said quantum dots and provided to said plurality of laser active ions by a non-radiative energy transfer that excites a laser output therefrom.

2. The laser gain medium of claim 1, wherein the non-radiative energy transfer to said plurality of laser active ions is a Forster resonant energy transfer.

3. The laser gain medium of claim 1, wherein each of said quantum dots is surrounded by an external shell containing the plurality of laser active ions therein, wherein the external shell is selected so as to allow both the energy absorbed by said quantum dots and the non-radiative energy transfer to pass therethrough.

4. The laser gain medium of claim 3, wherein said external shell is doped with said laser active ions.

5. The laser gain medium of claim 4, wherein said external shell is adapted to passivate said quantum dot to prevent a shortening of the quantum dot's exciton lifetime.

6. The laser gain medium of claim 1, wherein said quantum dots are adapted to absorb broadband energy and transform said broadband energy to narrowband energy spectrally matched to an absorption band or bands of said laser active ions.

7. The laser gain medium of claim 1, wherein said energy transfer includes a multiple exciton generation process.

8. The laser gain medium of claim 1, wherein said host material is a solid-state insulating host.

9. The laser gain medium of claim 1, wherein said laser active ions are rare earth ions.

10. A laser comprising:
a pump source adapted to radiate broadband energy and
a gain medium including a plurality of undoped quantum dots and laser active ions surrounding each of the plurality of undoped quantum dots, wherein said undoped quantum dots are adapted to absorb said broadband energy and excite said laser active ions to produce laser output,
wherein said undoped quantum dots excite said laser active ions by non-radiatively transferring said broadband energy via a Förster resonant energy transfer.

11. The laser of claim 10, wherein each of said undoped quantum dots is surrounded by an external shell.

12. The laser of claim 11, wherein said external shell is doped with said laser active ions.

13. A quantum dot assembly comprising:
an undoped quantum dot;

an external shell surrounding said undoped quantum dot; and a plurality of laser active ions dispersed throughout said external shell so as to surround said undoped quantum dot, wherein said external shell is adapted to passivate said undoped quantum dot to prevent a shortening of the quantum dot's exciton lifetime.

14. A sun-pumped laser comprising:

a mirror;

an output coupler; and a gain medium disposed between said mirror and output coupler, wherein said gain medium includes a plurality of undoped quantum dots and laser active ions dispersed through an insulating host surrounding each of said plurality of undoped quantum dots, wherein said undoped quantum dots are adapted to absorb solar energy and excite said laser active ions via a non-radiative energy transfer to produce laser output.

15. A method for generating laser energy, the method comprising:

absorbing broadband energy in undoped quantum dots and exciting laser active ions to output laser energy by non-radiatively transferring said broadband energy from said undoped quantum dots to said laser active ions via a Föresonant energy transfer.

16. The laser gain medium of claim 1, wherein the insulating host material is selected to transmit broadband pump radiation absorbed by the plurality of undoped quantum dots.

17. The quantum dot assembly of claim 13, wherein the external shell is made of semiconductor.

\* \* \* \* \*